(12) United States Patent
Zenou et al.

(10) Patent No.: US 12,552,179 B2
(45) Date of Patent: Feb. 17, 2026

(54) LARGE AREA LASER PRINTING SYSTEM AND METHOD

(71) Applicant: Reophotonics, Ltd., Modiin (IL)

(72) Inventors: Michael Zenou, Hashmonaim (IL); Elad Dotan, Talmei Yehiel (IL)

(73) Assignee: Reophotonics, Ltd., Modiin (IL)

( * ) Notice: Subject to any disclaimer, the term of this patent is extended or adjusted under 35 U.S.C. 154(b) by 231 days.

(21) Appl. No.: 18/349,694

(22) Filed: Jul. 10, 2023

(65) Prior Publication Data

US 2024/0042773 A1    Feb. 8, 2024

Related U.S. Application Data

(60) Provisional application No. 63/370,412, filed on Aug. 4, 2022.

(51) Int. Cl.
*B41M 5/08* (2006.01)
*B41J 2/045* (2006.01)
(Continued)

(52) U.S. Cl.
CPC ............ *B41J 3/30* (2013.01); *B41J 2/04556* (2013.01); *B41J 2/16532* (2013.01);
(Continued)

(58) Field of Classification Search
CPC ...... B41J 3/30; B41J 2/04556; B41J 2/16532; B41J 2/33535; B41J 2/442; B41J 2/5056;
(Continued)

(56) References Cited

U.S. PATENT DOCUMENTS

| 5,192,559 A | * | 3/1993 | Hull | ...... B29C 64/188 |
| | | | | 425/375 |
| 5,342,817 A | * | 8/1994 | Sarraf | ...... B41M 5/38207 |
| | | | | 503/227 |

(Continued)

FOREIGN PATENT DOCUMENTS

| JP | 2004095555 A | * | 3/2004 | ........... B41M 5/265 |
| WO | WO-2019138404 A1 | * | 7/2019 | ........... H01C 17/242 |

OTHER PUBLICATIONS

Written Opinion of the International Preliminary Examining Authority mailed Jun. 27, 2024, from the IPEA/European Patent Office, for International Patent Application No. PCT/IB2023/057079 (filed Jul. 10, 2023), 7 pgs.

(Continued)

*Primary Examiner* — Yaovi M Ameh
(74) *Attorney, Agent, or Firm* — Ascenda Law Group, PC

(57) ABSTRACT

Systems and methods for laser assisted deposition of a material includes a printing unit configured to print individual dot-like portions of a material from a donor substrate onto a receiving substrate, and a vacuum shuttle configured to be positionable in two or three dimensions between the printing unit and the donor substrate and to engage the donor substrate upon application of a vacuum to the vacuum shuttle. The printing unit may include a coating system and a laser. The vacuum shuttle includes a vacuum channel about its periphery and an open window through which the laser irradiates the donor substrate. The vacuum channel is fluidly coupled to a vacuum inlet for receiving a vacuum suction, thereby to engage the donor substrate and hold it taught against the bottom of the vacuum shuttle in operation. The vacuum shuttle may also include one or more distance measuring sensors and fiducial markers.

13 Claims, 11 Drawing Sheets

(51) Int. Cl.
*B41J 2/165* (2006.01)
*B41J 2/335* (2006.01)
*B41J 2/44* (2006.01)
*B41J 2/475* (2006.01)
*B41J 2/505* (2006.01)
*B41J 3/30* (2006.01)
*B41J 11/00* (2006.01)
*B41J 25/00* (2006.01)
*B41M 5/035* (2006.01)
*B41M 5/382* (2006.01)

(52) U.S. Cl.
CPC .......... *B41J 2/33535* (2013.01); *B41J 2/442* (2013.01); *B41J 2/475* (2013.01); *B41J 2/5056* (2013.01); *B41J 11/0015* (2013.01); *B41J 25/001* (2013.01); *B41M 5/0358* (2013.01); *B41M 5/08* (2013.01); *B41M 5/38221* (2013.01); *B41J 2203/01* (2020.08)

(58) Field of Classification Search
CPC .. B41J 11/0015; B41J 25/001; B41J 2203/01; B41J 2/475; B41M 5/0358; B41M 5/08; B41M 5/38221
See application file for complete search history.

(56) References Cited

U.S. PATENT DOCUMENTS

| | | | |
|---|---|---|---|
| 2003/0113656 A1* | 6/2003 | Tyan | H10K 71/18 430/207 |
| 2008/0094465 A1 | 4/2008 | Okutsu | |
| 2022/0040912 A1 | 2/2022 | Zenou et al. | |

OTHER PUBLICATIONS

International Preliminary Report on Patentability dated Nov. 21, 2024, from the IPEA/European Patent Office, for International Patent Application No. PCT/IB2023/057079 (filed Jul. 10, 2023), 48 pgs.

International Search Report and Written Opinion mailed Oct. 26, 2023, from the ISA/European Patent Office, for International Patent Application No. PCT/IB2023/057079 (filed Jul. 10, 2023), 13 pgs.

* cited by examiner

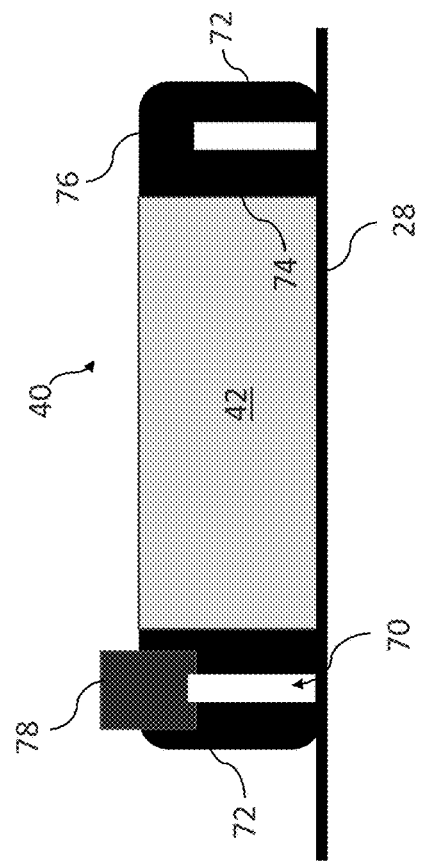
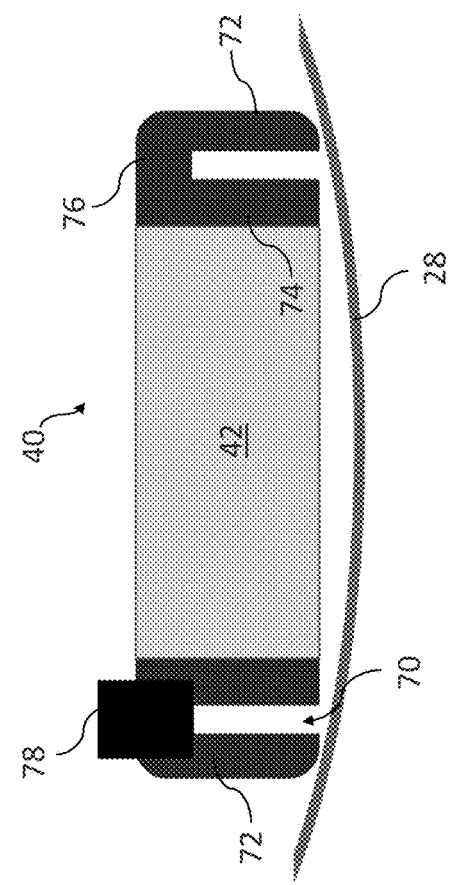
Fig. 8B
Fig. 8A

LARGE AREA LASER PRINTING SYSTEM AND METHOD

RELATED APPLICATIONS

This application is a nonprovisional of, claims priority to, and incorporates by reference U.S. Provisional Application No. 63/370,412, filed on 4 Aug. 2022.

FIELD OF THE INVENTION

The present invention relates to systems and methods for laser printing a material from a foil or a film over a large area by a laser assisted deposition/laser dispensing system.

BACKGROUND

Surface Mount Technology (SMT) is an area of electronic assembly used to mount electronic components to the surface of a printed circuit board (PCB) as opposed to inserting components through holes in the PCB as in conventional assembly. SMT was developed to reduce manufacturing costs and allow efficient use of PCB space. As a result of the introduction of surface mount technology and ever increasing levels of automation, it is now possible to build highly complex electronic circuits into smaller and smaller assemblies with good repeatability.

The surface mount soldering process involves placing the electrical contact of an electronic component or substrate, a small amount of solder paste, and a solder-wettable pad on a printed circuit board in proximity to one another. The materials are then heated until the solder reflows, forming an electrical connection between the solder-wettable pad and the electrical contact of the electronic component. Once the solder has reflowed, it forms both an electrical and a mechanical connection between the electronic component and the printed circuit board. This process has numerous advantages over other methods of interconnection because components can be interconnected simultaneously and the process is repeatable, low cost, and easy to adapt for mass production.

One of the most important parts of the surface mount assembly process is the application of solder paste to the printed circuit board. The aim of this process is to accurately deposit the correct amount of solder onto each of the pads to be soldered. This is achieved generally by screen-printing the solder paste through a stencil or foil but also may be done by jet printing. It is widely believed that this part of the process, if not controlled correctly, accounts for most of the assembly defects.

SUMMARY OF THE INVENTION

In one embodiment, a system for laser assisted deposition of a material includes a printing unit configured to print individual dot-like portions of a material from a donor substrate onto a receiving substrate, and a vacuum shuttle configured to be positionable (in two or three dimensions) between the printing unit and the donor substrate and to engage said donor substrate upon application of a vacuum to the vacuum shuttle. The printing unit may include a coating system configured to create a uniform layer of the material on the donor substrate, and also includes a laser. The vacuum shuttle includes an open window through which the laser can irradiate the donor substrate and further includes a vacuum channel about its periphery. The vacuum channel is fluidly coupled to a vacuum inlet for receiving a vacuum suction, thereby to engage the donor substrate and hold it taut against the bottom of the vacuum shuttle in operation. In various embodiments, the vacuum shuttle may also include one or more distance measuring sensors for determining a position of the vacuum shuttle with respect to the receiving substrate and/or one or more imaging sensors for imaging the receiving substrate. The vacuum shuttle may also include one or more fiducial markers for use in aligning the laser.

A further embodiment of the invention provides a method of operating the above-described laser assisted deposition system. From a state in which the vacuum shuttle is positioned so as to be adjacent a portion of the donor substrate and engaged thereto by virtue of an applied vacuum suction, the vacuum suction may be released, thereby allowing the vacuum shuttle to disengage from the donor substrate, and the vacuum shuttle displaced vertically from the donor shuttle. Thereafter, the vacuum shuttle may be moved laterally (in one or two dimensions) with respect to the donor substrate, the vacuum suction reapplied, and the vacuum shuttle moved vertically so as to be adjacent to and engage the donor substrate, bringing the donor substrate taut against the bottom of the vacuum shuttle again.

These and further embodiments of the invention are described in greater detail below.

BRIEF DESCRIPTION OF THE DRAWINGS

The present invention is illustrated by way of example, and not limitation, in the figures of the accompanying drawings, in which:

FIGS. 8A and 8B illustrate relative arrangements of a vacuum shuttle and donor substrate when no vacuum force is applied (FIG. 8A) and when a vacuum force is applied (FIG. 8B).

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components.

Figure 1:
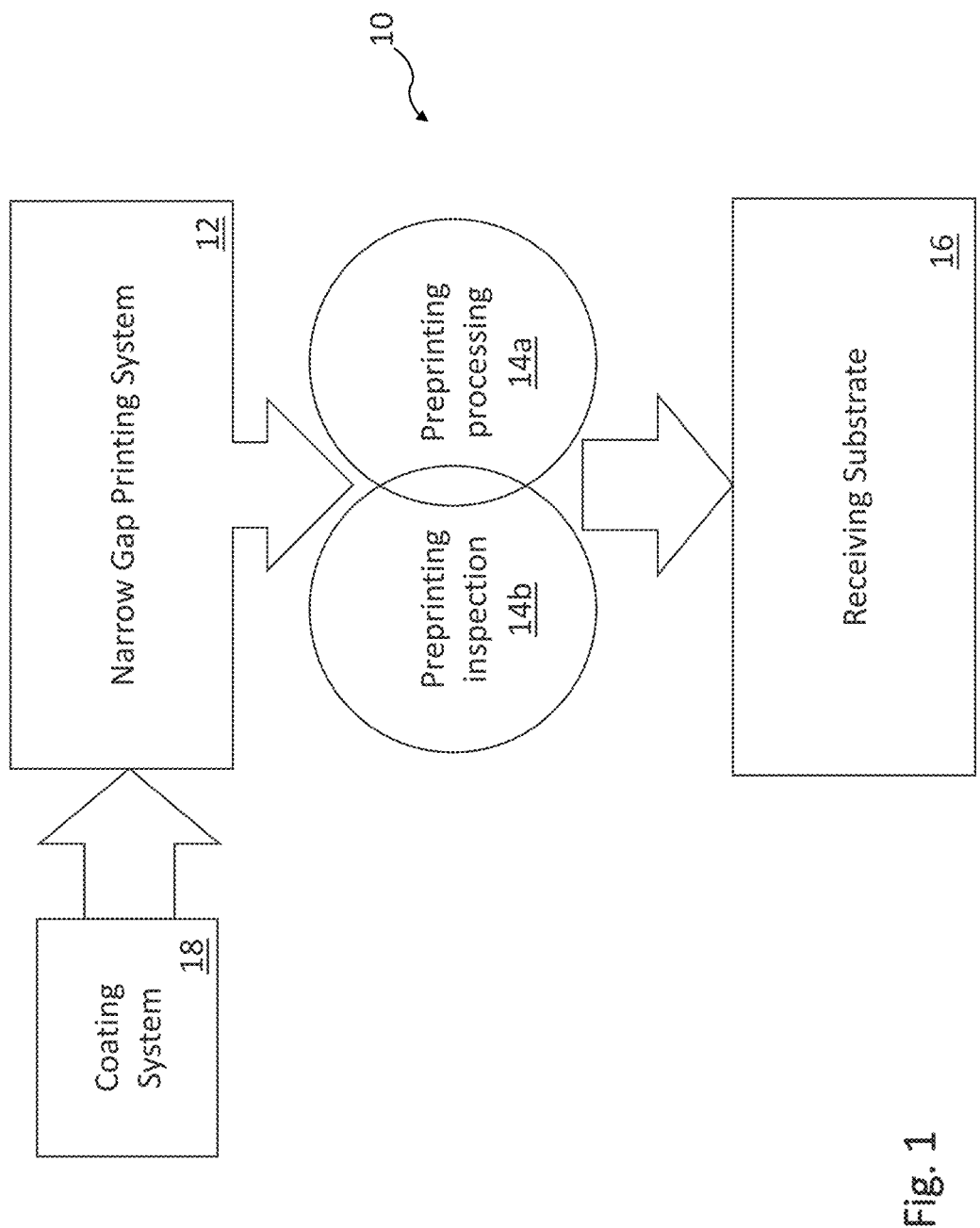
FIG. 1 illustrates, conceptually, a system for printing viscous materials, such as solder paste, over a wide area, in accordance with embodiments of the invention.

FIG. 1 provides a conceptual overview of a system 10 that employs a narrow gap printing system 12, preprinting processing and/or inspection 14a, 14b, a receiving substrate 16, and a coating system 18 to provide high resolution and high speed printing of materials, e.g., viscous materials such as solder paste, over a wide area in accordance with embodiments of the invention. As further described below, the narrow gap printing system 12 prints the viscous material from a coated donor substrate to the receiving substrate 16 using laser assisted deposition. Prior to (or concurrently with) such printing, preprinting processing and/or inspection 14a, 14b, of the receiving substrate by one or more imaging arrangements and/or distance monitoring elements for monitoring and positioning control of the printing processes may be performed. In one implementation of this printing procedure, the viscous material is distributed as dots (e.g., small, generally round spots or droplets) by the laser assisted deposition process over a wide area on the receiving substrate by moving a vacuum shuttle and/or an incident point of the laser performing the deposition with respect to the donor substrate.

The laser assisted deposition process involves dots of the viscous material being ejected from a uniform layer thereof on the coated donor substrate onto the receiving substrate (e.g., a printed circuit board or other substrate) using a fast frequency laser. The deposition of the material is preferably conducted in a well-defined and robust way to minimize variations in dot sizes. To ensure the uniform coating of the viscous material onto the donor substrate, a coating system 18 is used to coat the donor substrate before it is provided to a printing unit at which the laser assisted deposition is performed. This coating system 18 may be a traditional coating system such as a coating system based on a micro gravure or slot die coater or a roller coating system. Alternatively, the coating system 18 may be a screen printing-based coating system, a dispenser, or an inkjet system. In still other embodiments, the coating system 18 may be based on a syringe and a gap system in which the viscous material is dispensed from a syringe to the donor substrate which then passes through a well-defined gap, e.g., formed by blade of other kind of barrier, or a pair of rollers or cylinders. After passing through the gap, a uniform layer of the viscous material will be present on the donor substrate and the laser assisted deposition system can jet dots of material from the coated donor substrate to the receiver substrate. After providing the uniform layer of viscous material for printing, the donor substrate can be returned to the coating system (e.g., in a loop or by linear translation) for recoating by the coating system to create a new uniform coated layer on the donor substrate for the next printing by the printing process, or may be taken up on a receiving reel. The donor substrate may be a transparent film or other substrate, with or without a metal (or other) coating.

Systems configured in accordance with embodiments of the present invention may be used for printing a wide variety of liquid and/or paste materials. However, the present invention provides particular benefits for the printing of highly viscous materials that cannot be printed well in high resolution by other methods. For example, systems configured in accordance with embodiments of the present invention find particular application in printing solder pastes and other metal pastes, as well as high viscosity polymers, like acrylics, epoxies, and urethane-based adhesives, pastes or waxes. The present invention may also be employed in connection with the printing of sensitive materials since a coated, donor substrate can be maintained in a controlled environment prior to the printing process so as to avoid solvent evaporation or oxidation of the material to be printed. Such a space may also provide a controlled area for temperature-sensitive materials.

Figure 2:
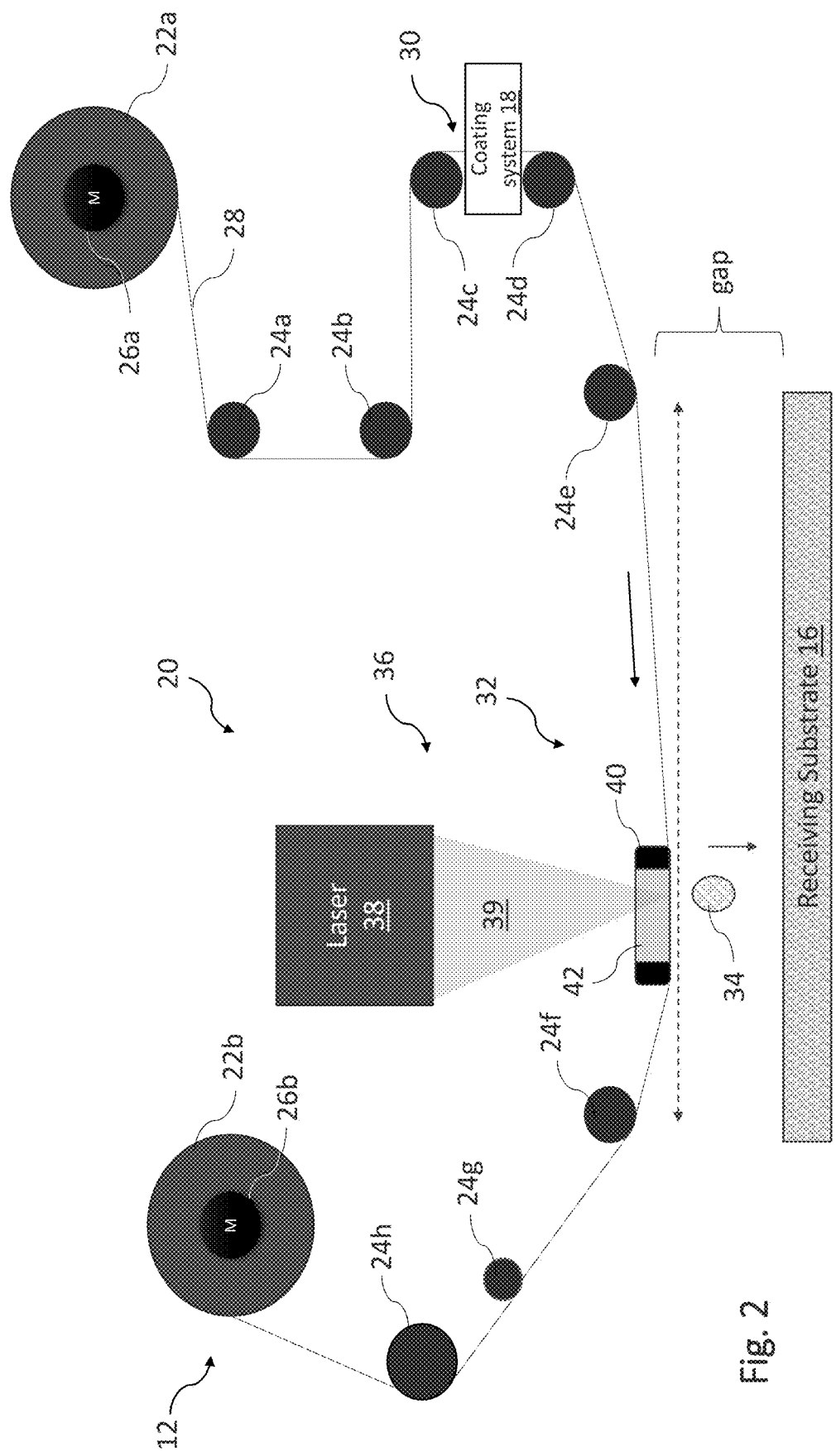
FIG. 2 illustrates aspects of a large area laser printing system configured in accordance with the conceptual overview presented in FIG. 1.

FIG. 2 illustrates aspects of a large area laser printing system 20 (also called a printing unit 20) configured in accordance with the conceptual overview presented in FIG. 1. Printing system 20 includes a coating system 18 that creates a uniform layer of to-be printed material (e.g., a highly viscous material such as a solder paste or other metal paste(s) used for printed electronics, a ceramic paste, a wax material, a polymer material or a mix of a polymer and a monomer material, or a sensitive low viscosity material) on a donor substrate 28, such as a foil or transparent film. Donor substrate 28 may be wound up on a dispensing reel 22a and advanced through a series of roller 24a-24h, e.g., using motors 26a, 26b, to a take-up reel 22b. Along the way, the donor substrate 28 passes through the coating area 30, where it is coated with the layer of to-be printed material, and the dispensing area 32, where dots 34 of the material are jetted from the donor substrate 28 across a narrow gap towards the receiving substrate 16 by a laser assisted deposition system 36 of the large area laser printing system 20.

The laser assisted deposition system 36 includes a laser 38, which produces a laser beam 39 that is directed, e.g., through an optical system (not shown), to be incident on the donor substrate 28, through a window 42 in a vacuum shuttle 40. The makeup and operation of vacuum shuttle 40 is described in greater detail below. As shown, vacuum shuttle 40 can translate across the expanse of receiving substrate 16 (or, optionally, more or less than that dimension) in the plane of the page of the drawing and can also be translated in a direction orthogonal to the page so as to cover the entirety of the receiving substrate (or, optionally, more or less than that area). To accommodate such motion, the laser beam 39 may be moveable, e.g., by a scanning mirror or other optical arrangement, and/or by mounting the laser 38 on a platform moveable in two or three dimensions.

In one embodiment of the invention, the coating system 18 includes a syringe of the to-be printed material and an air or mechanical pump that drives the material onto the donor substrate 28. The donor substrate 28 is then moved, using motors 26a, 26b, toward a well-defined gap between rollers or knives to create a uniform layer of the to-be printed material with a thickness that is defined by the gap. In some embodiments of the invention, the donor substrate 28 can translate bidirectionally in a controlled manner, while opening the gap between the coater rollers, creating the possibility for recoating the same area of the donor substrate with the to-be printed material without contamination to the rollers and reducing or eliminating the amount of substrate consumed during the printing process, thereby preventing waste.

In further embodiments, coating system 18 may include a screen-printing module where the donor substrate 28 is coated using a screen or stencil with well-defined holes, the viscous material being applied thereto using a blade or a squeegee, with the viscous material being later transferred to the donor substrate 28 in a soft or hard engage. Alternatively, coating system 18 may include a dispenser or an inkjet head to print the viscous material onto donor substrate 28. Or, the coating system 18 may be a gravure or micro-gravure system that coats donor substrate 28 with a highly uniform layer of the material to be printed. In still further embodiments of the invention, coating system 18 is a slot-die system that coats donor substrate 28 with a highly uniform layer of the material to be printed. In another embodiment of the invention, coating system 18 is a roller coating system that coats donor substrate 28 with a highly uniform layer of the material to be printed.

Although not shown in FIG. 2, in one embodiment of the invention the laser assisted deposition system 36 and/or coating system 18 may be housed inside a closed cell with a controlled environment (cold or hot) to prevent evaporation of solvent from the to-be printed material or to prevent material oxidation, thereby prolonging the pot life of the material. In some embodiments of the invention, the coating system 18 contains more than one material, thereby creating a possibility for printing plural materials onto donor substrate 28 in a controlled sequence and making it possible to print more than one material on receiving substrate 16.

The laser 38 of the laser assisted deposition system 36 may be a high frequency laser configured to jet portions of the layer of coated material from the donor substrate 28 to receiving substrate 16 by irradiating the donor substrate 28 at selected locations through the window 42 of vacuum shuttle 40. For example, a high frequency ultra-violet (UV) or infrared (IR) laser may be used. In some embodiments of the invention, the laser 38 may be configured to scan the laser beam 39 in a raster-like pattern within the confines of window 42 so as to print dots 34 of material from the donor substrate 28 onto the receiving substrate 16.

Figure 3:
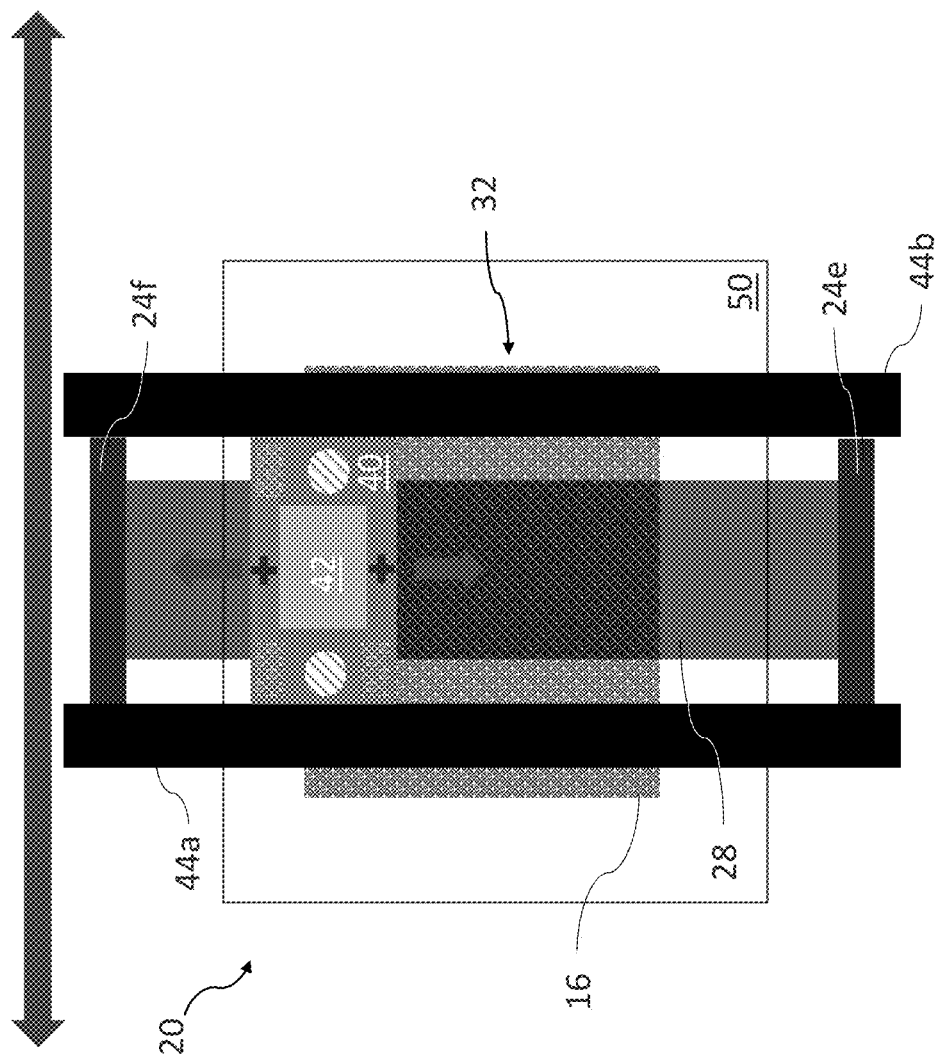
FIG. 3 is a top view of a portion of the large area laser printing system of FIG. 2, showing a view looking down towards a receiving substrate from above a vacuum shuttle positioned above a donor substrate.

FIG. 3 is a top view of a portion of large area laser printing system 20, showing the view looking down towards receiving substrate 16, which is positioned on a receiving substrate stage 50, from above the vacuum shuttle 40 positioned above the donor substrate 28. In this example, the vacuum shuttle 40 is located in the dispensing area 32, between rollers 24e and 24f, which are supported by rails 44a, 44b. The entire assembly is laterally translatable in the plane of the page, while the vacuum shuttle 40 is translatable within the dispensing area 32 in the plane of the page. For example, the assembly may be mounted on a translatable sled that can be positioned so as to locate the dispensing area 32 above a receiving substrate 16, as shown, or, when not in use, to be positioned to one side or the other of a dispensing area. This allows access to the receiving substrate 16 and/or the receiving substrate stage 50 before and after a printing session. It further allows the dispensing area 32 to be positioned over a particular portion of the receiving substrate, for example, in cases where the receiving substrate 16 is wider than the window 42 of the vacuum shuttle 40.

Figure 4B:
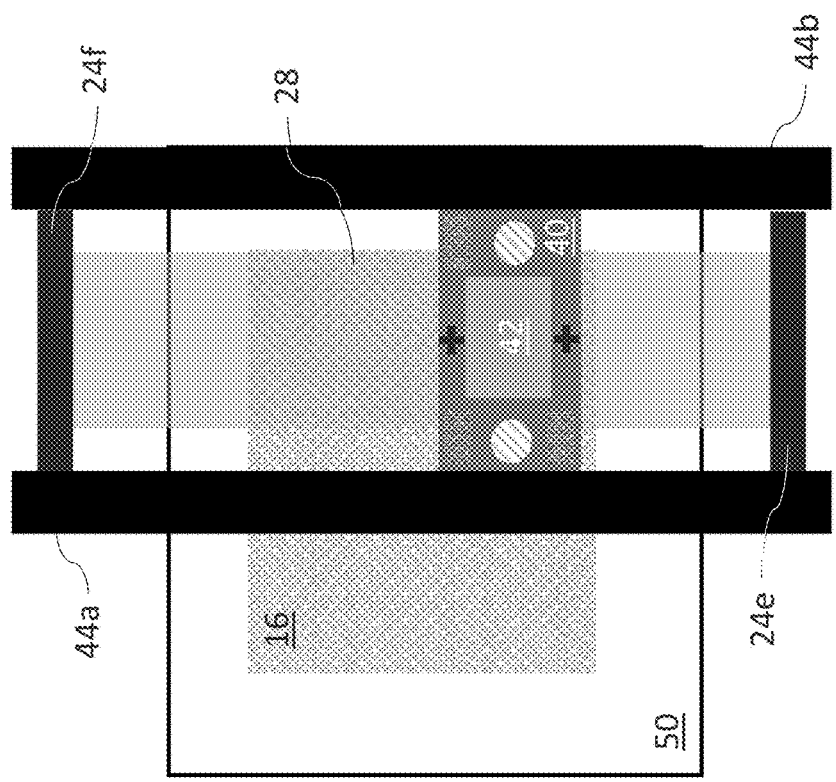
FIGS. 4A and 4B illustrate movement of a vacuum shuttle and its supporting assembly, in accordance with embodiments of the invention.
Figure 4A:
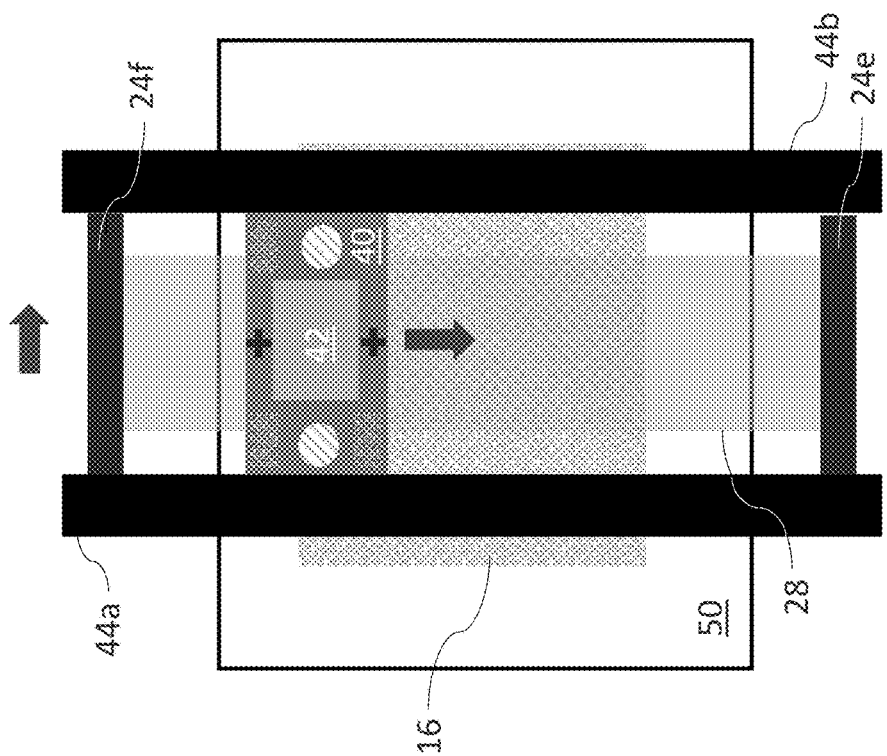

FIGS. 4A and 4B highlight the movement of the vacuum shuttle 40 and its supporting assembly. In FIG. 4A, the vacuum shuttle 40 is positioned at a first location, near the end of the receiving substrate 16 closest to roller 24f. From this position, the vacuum shuttle 40 is translated towards the opposite end of receiving substrate 16, closest to roller 24e. Concurrently (or, alternatively, before or after the translation of the vacuum shuttle), the assembly of which vacuum shuttle 40 is a part is translated laterally (rightwards in this example) towards a lateral edge of the receiving substrate 16. The result of these movements is illustrated in FIG. 4B, where the vacuum shuttle 40 is now in a new position with respect to the receiving substrate 16. Another way to regard this repositioning of the vacuum shuttle 40 is to appreciate that the dispensing area 32 has moved to a new location with respect to the receiving substrate 16. During this movement, the donor substrate 28 and the receiving substrate 16 remained stationary, however, in other embodiments either or both of the donor substrate 28 and the receiving substrate 16 may be moved while the vacuum shuttle 40 is being repositioned.

The movement of the vacuum shuttle 40 and/or the assembly of which it is a part may be under the control of a controller (not shown) and may be effected through the use of motors, linear actuators, or other means. For example, in one embodiment the movement of these components may be effected using stepper motors, piezo translators and/or motorized translators. A piezo translator may be used where small movements are required/desired and such a device may include one or more piezo ceramics arranged to move the associated item in a defined direction upon application of an electric current under the control of the controller.

Figure 5B:
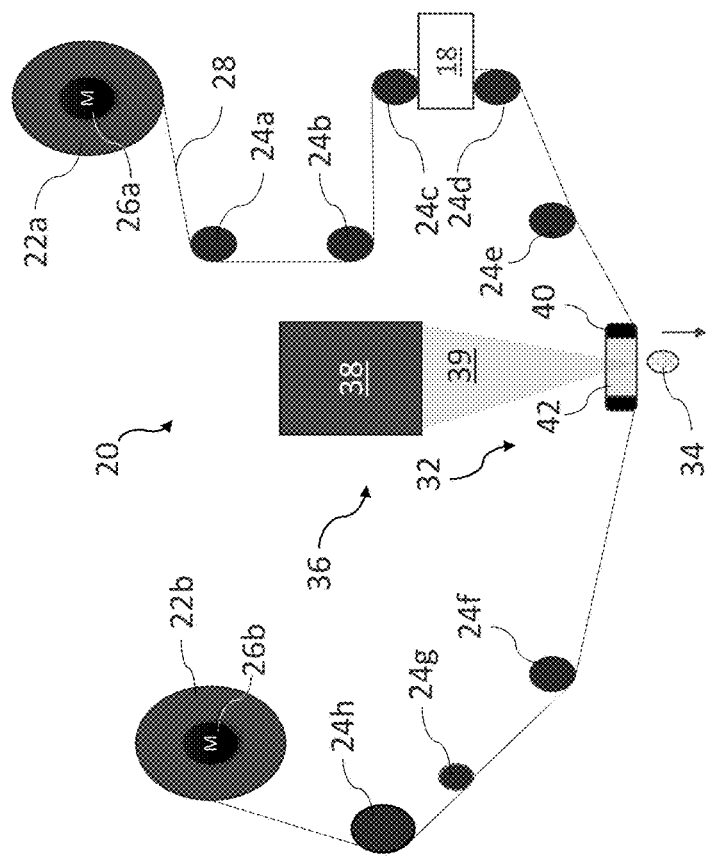
FIGS. 5A and 5B show side views of the movements depicted in FIGS. 4A and 4B.
Figure 5A:
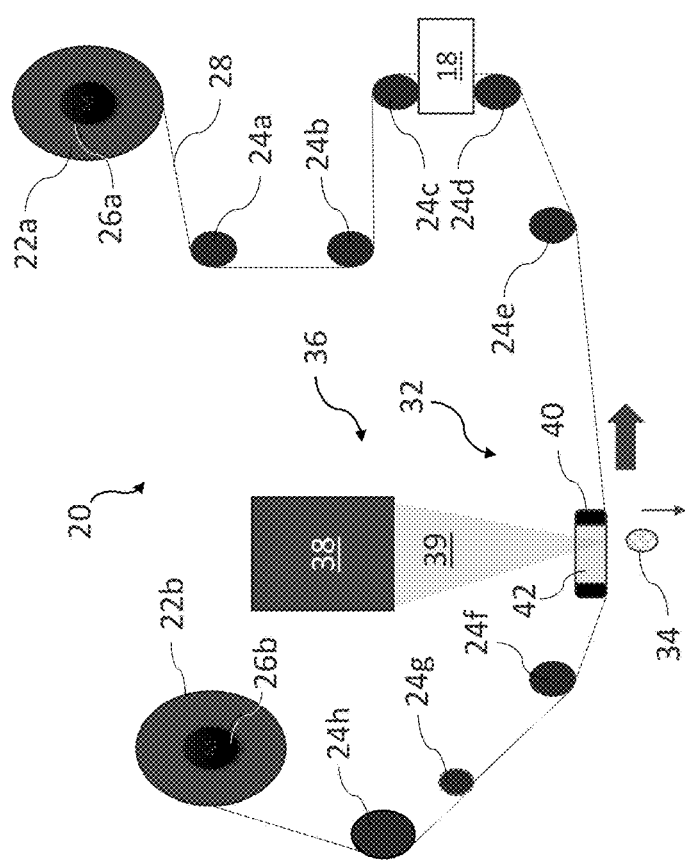

FIGS. 5A and 5B show side views of the movements depicted in FIGS. 4A and 4B. In FIG. 5A, the vacuum shuttle 40 is positioned at a first location, near the end of the receiving substrate 16 closest to roller 24f. From this position, the vacuum shuttle 40 is translated rightwards, closer to roller 24e, to a location as shown in FIG. 5B. Although not discernable in these views, currently (or, alternatively, before or after the translation of the vacuum shuttle), the assembly of which vacuum shuttle 40 is a part is translated orthogonal to the plane of the page. Another way to regard this repositioning of the vacuum shuttle 40 is to appreciate that the dispensing area 32 has moved to a new location. During this movement, the donor substrate 28 and the receiving substrate 16 (not shown in these views) remained stationary, however, in other embodiments either or both of the donor substrate 28 and the receiving substrate 16 may be moved while the vacuum shuttle 40 is being repositioned. The sequence of operations for moving the vacuum shuttle is discussed further below.

Figure 6B:
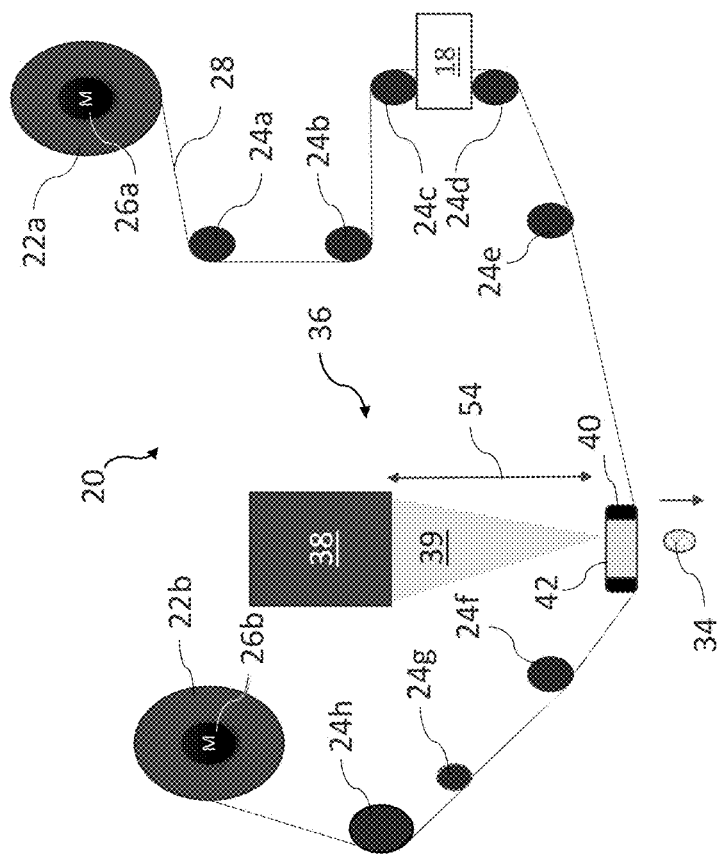
FIGS. 6A and 6B illustrate yet additional movements of components associated with a large area laser printing system, in accordance with embodiments of the invention.
Figure 6A:
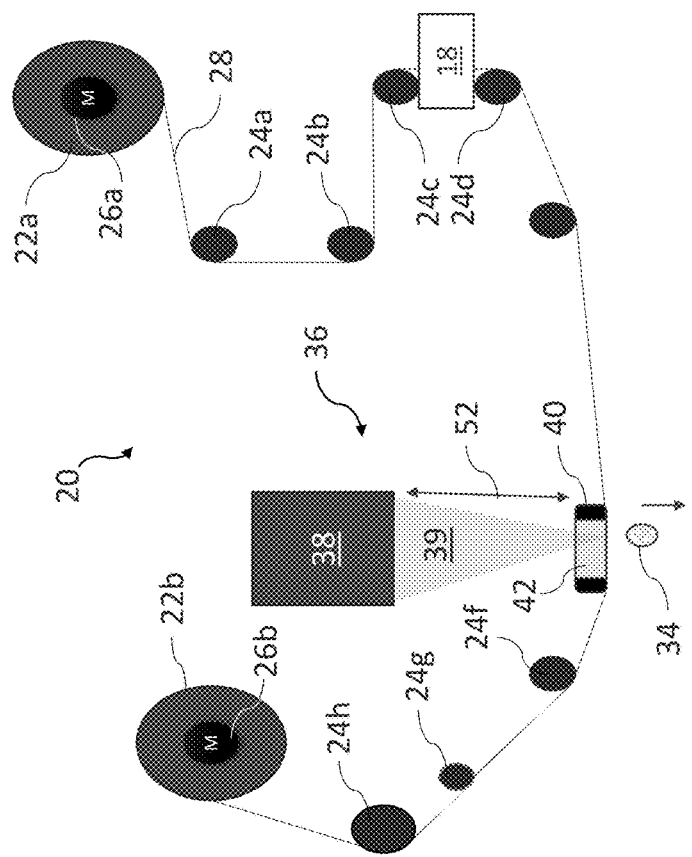

FIGS. 6A and 6B illustrate yet additional movements of components associated with large area laser printing system 20. In these views, the movement of the laser 38 with respect to the vacuum shuttle 40 (and the donor substrate 28) is highlighted. In FIG. 6A, the laser 38 is positioned a first distance 52 from the vacuum shuttle 40. In FIG. 6B, the laser 38 is positioned a second distance 54 from the vacuum shuttle 40, where the second distance is greater than the first distance. To accommodate this movement, the laser 38 (or the optical system that is responsible for directing the laser beam 39) may be positioned on a moveable assembly that can translate in a direction vertically with respect to the vacuum shuttle 40. This vertical translation can be used to define a print area on the donor substrate 28 and/or to accommodate movement of the vacuum shuttle 40. Notice that in FIGS. 5A and 5B, the laser 38 (or the optical system that is responsible for directing the laser beam 39) also translated laterally with the movement of vacuum shuttle 40. Thus, the moveable assembly on which the laser and/or its optical system is mounted may be moveable in two or three dimensions, to accommodate the various movements of the vacuum shuttle as well as for repositioning in a direction orthogonal to that plane of movement. In some cases, the movement of the laser may be accommodated through operation of a scanning mirror and other optical components (e.g., lenses) instead of, or in addition to, physical movement of laser 38.

Figure 7B:
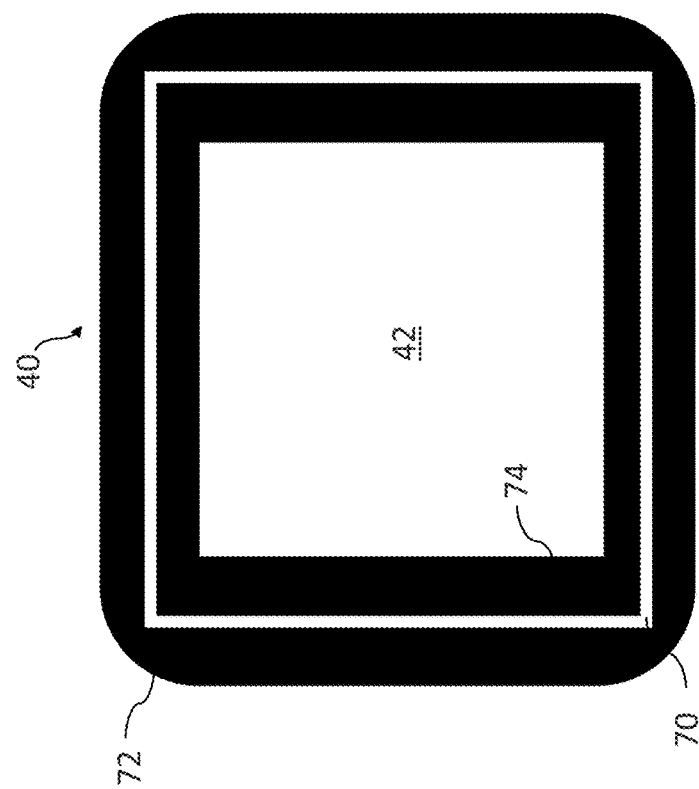
FIGS. 7A and 7B illustrate an example of vacuum shuttle configured in accordance with embodiments of the invention.
Figure 7A:
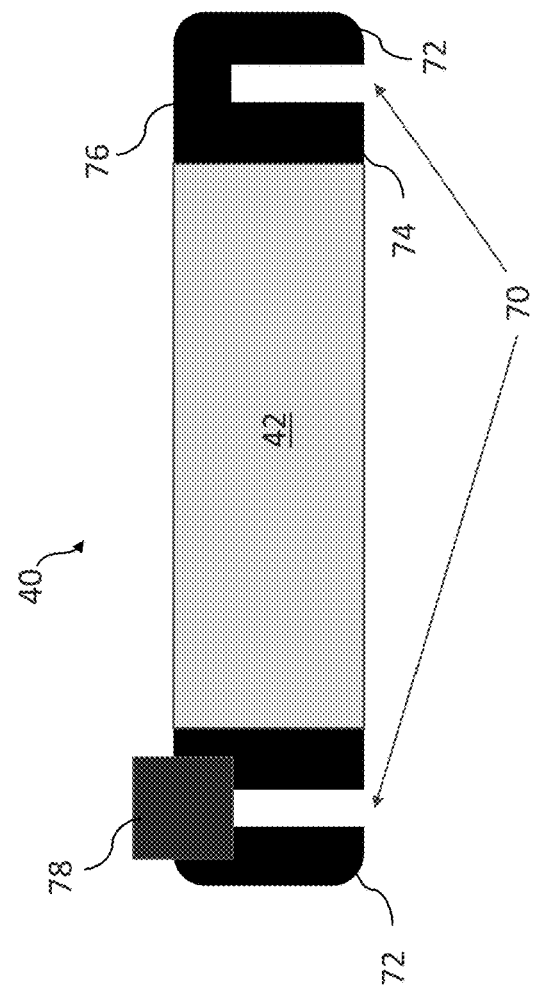

FIGS. 7A and 7B illustrate an example of vacuum shuttle 40 in greater detail. FIG. 7A is a side, partial cut-away view of the vacuum shuttle 40, and FIG. 7B is a bottom view thereof. Note, for clarity not all of the features of the vacuum shuttle 40 are depicted in these illustrations, which focus on the vacuum channel 70 that is provided in vacuum shuttle 40.

As shown in these views, vacuum shuttle 40 has a central opening 42, which may be of any desired shape. In the illustrated example, the central opening 42 is rectangular, but it may also be circular, oval, square, triangular, or even of irregular shape. The perimeter of vacuum shuttle 40 includes an outer edge 72 and an inner edge 74, which together define the vacuum channel 70 which extends between them and is open to the bottom of the vacuum shuttle 40. The top of the vacuum channel 70 is capped by a portion 76, thus the entire perimeter of the vacuum shuttle 40 is approximately horseshoe-shaped in cross section. A vacuum inlet 78 is fluidly coupled to and provides access to the vacuum channel 70 along its length and, in practice, is fluidly coupled to a vacuum pump for application of a vacuum when the vacuum shuttle abuts a donor substrate 28.

As shown in FIGS. 8A and 8B, when the vacuum shuttle 40 is positioned above and adjacent a donor substrate 28, the donor substrate 28 will initially be displaced slightly below the vacuum shuttle 40 and will have some amount of curvature in its profile. Upon application of a vacuum to vacuum channel 70 of vacuum shuttle 40, however, the donor substrate 28 will be made taut against the underside of the vacuum shuttle 40, as shown in FIG. 8B. With the donor substrate 28 so held against the underside of the vacuum shuttle 40, its position vis-à-vis the laser 38 and the receiving substrate 16 will remain constant, allowing accurate printing of the material coated on donor substrate 28 to be performed. To subsequently move the vacuum shuttle 40 to a new position over the donor substrate 28 and/or to advance the donor substrate 28 between reels 26a, 26b, the vacuum is withdrawn, and the donor substrate 28 and vacuum shuttle 40 return to their respective arrangements with respect to one another, as shown in FIG. 8A.

Figure 9:
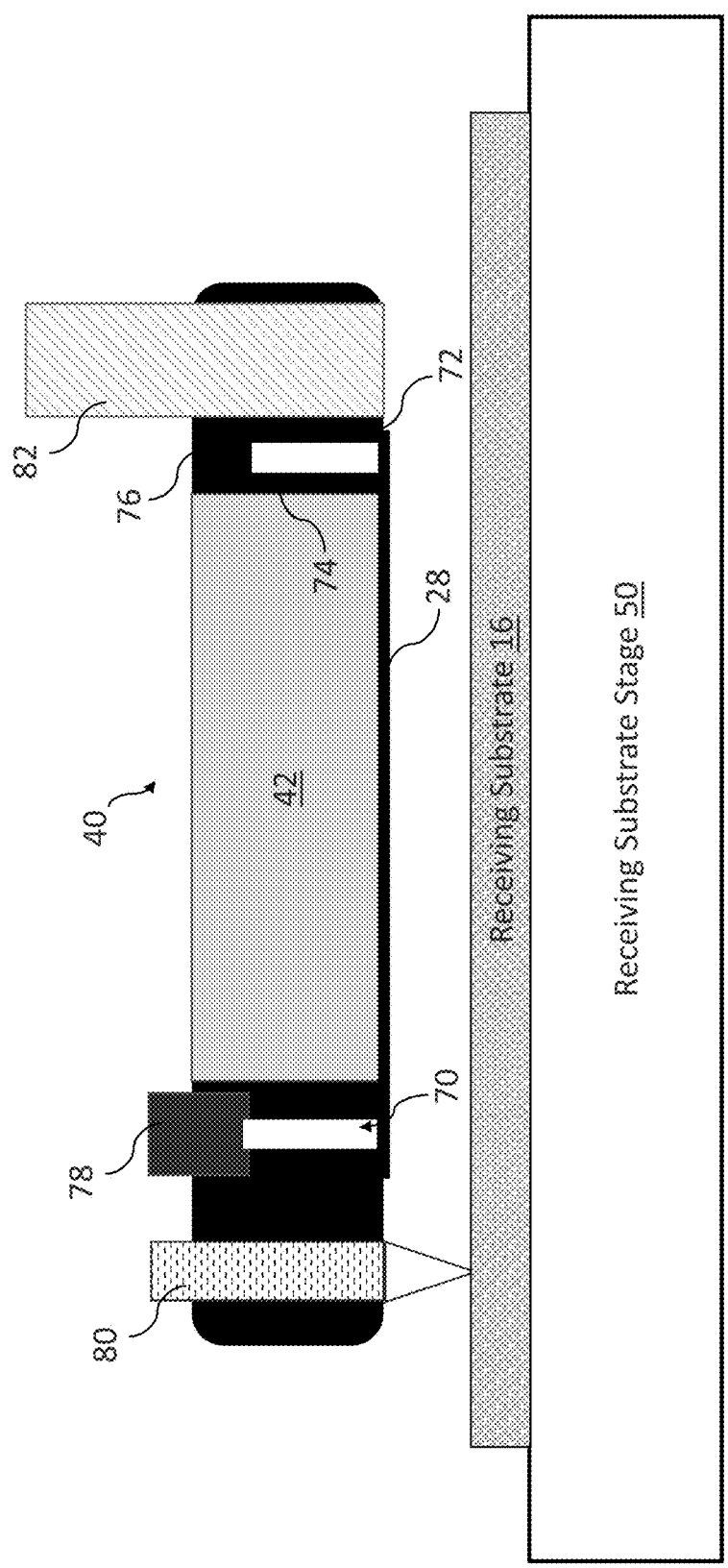
FIG. 9 illustrates further features of a vacuum shuttle, including one or more distance measuring sensors and one or more imaging sensors, in accordance with embodiments of the invention.
Figure 10:
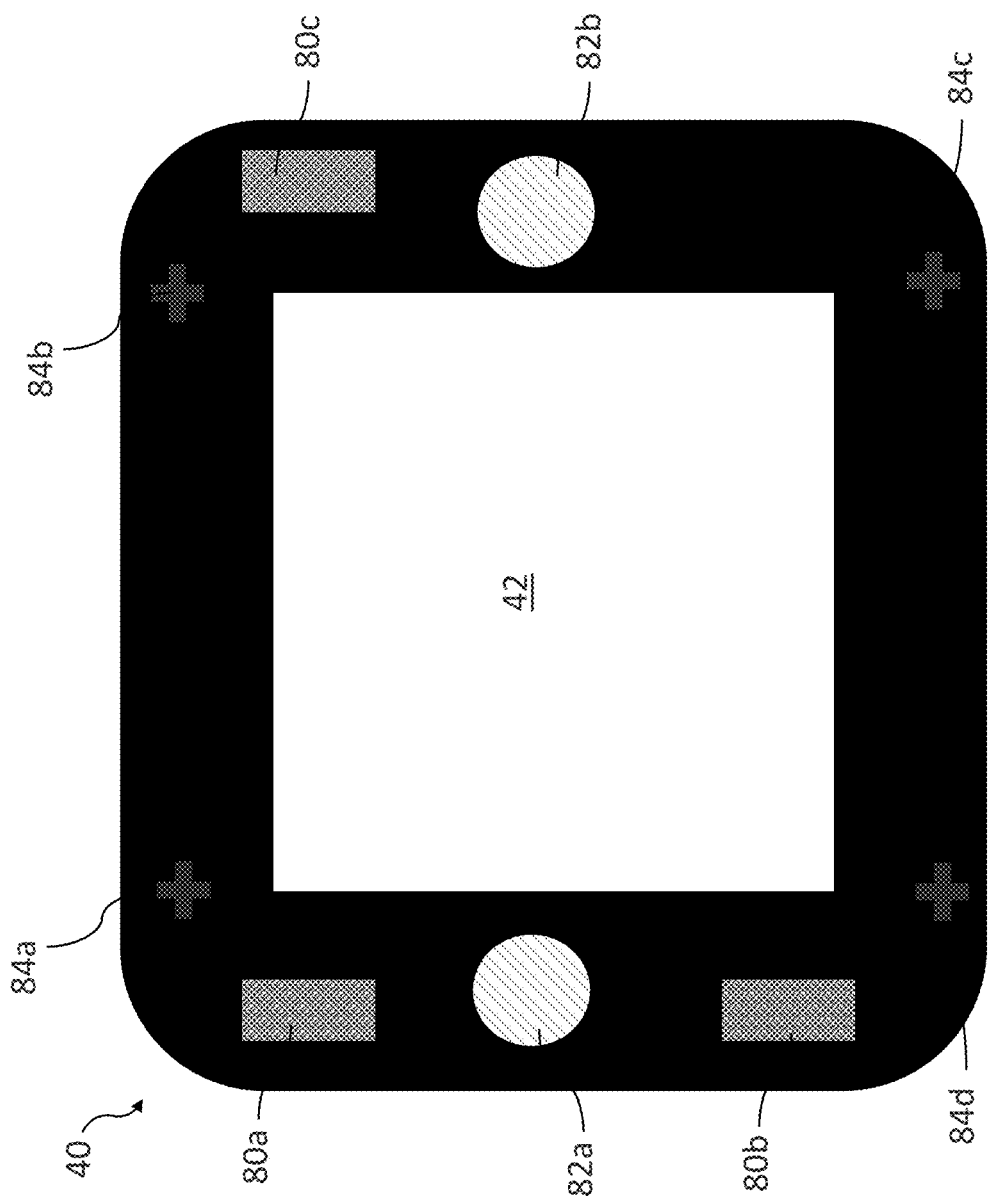
FIG. 10 is a bottom view of a vacuum shuttle configured in accordance with embodiments of the invention.

FIG. 9 now illustrates further features of vacuum shuttle 40, including one or more distance measuring sensors 80 and one or more imaging sensors 82, each positioned about the periphery of the vacuum shuttle 40. Distance sensor(s) 80 may be used to determine a height above a receiving substrate 16 and may be, for example, ultrasound sensors, lasers sensors, or other means of distance detection. Imaging sensors 82 may also be positioned about the periphery of vacuum shuttle 40, e.g., on sides opposite those of the distance measuring sensors, or, as shown in FIG. 10, which is a bottom view of the vacuum shuttle 40, between or adjacent the distance measuring sensors on one or more sides of the vacuum shuttle 40. For example, three (or more) distance measuring sensors, 80a, 80b, 80c, may be positioned about the periphery of the vacuum shuttle 40, e.g., two on one side and one on an opposite side thereof, and may be used to measure tilt in the receiving substrate 16. The receiving substrate stage 50 may be configured to be moveable about axes that define its plane so as to position the receiving substrate 16 at a tilt with respect to the plane of the donor substrate 28. By using three distance measuring sensors, 80a, 80b, 80c, the relative displacement in terms of distance and tilt between the plane of the vacuum shuttle 40 and the receiving substrate 16 can be determined. This information may be used by a controller (not shown) to adjust the position of the receiving substrate stage 50, and, hence, the receiving substrate 16, so that the plane and distance of the receiving substrate 16 with respect to the vacuum shuttle 40 are at desired orientations and distance(s) for the printing process.

Also illustrated in FIG. 10 are two different imaging systems, 82a, 82b. Imaging system 82a may be a high magnification imaging system, useful, for example, to inspect the results of the printing process. Imaging system 82b may be a wide field imaging system, useful, for example, to aid in positioning the vacuum shuttle 40 with respect to the receiving substrate 16. Either or both of the imaging systems 82a, 82b, may be one or more microscopes, charge-coupled devices (CCD), and/or other imaging components that take a picture (or pictures) of the receiving substrate 16 and/or printed dots of material on the receiving substrate 16. A controller or other component (not shown) may receive the images from either or both of imaging systems 82a, 82b, and, optionally, measure printed dots on the receiving substrate 16 so as to ensure that the dots are printed in appropriate size and position. This measurement data may be subsequently used to adjust the printing process, for example, by modifying the duration of the laser pulses, the thickness of the coating of the material to be printed on the donor substrate, the position of the vacuum shuttle relative to the receiving substrate, etc. Similarly, the images may be used, for example, to cause reprinting of one or more dots of material from the donor substrate. In the event an optical or other imaging inspection reveals that some of the dots of material printed on receiving substrate 16 are misshapen or otherwise unsuitable, a controller (not shown) having access to this data may then operate the printing unit so as to reprint the affected area. Imaging systems 82a, 82b may be operated before and/or after the material transfer from the donor substrate 28 and may capture images that can be used for preprinting and post-printing evaluation. In one embodiment of the invention, further imaging systems (not shown) may be positioned to capture side views of the receiving substrate 16 so that dots of printed material can be evaluated in three dimensions.

In addition to the imaging and distance measuring sensors, vacuum shuttle 40 may include one or more fiducial markers 84a-84d positioned at various points about the periphery of vacuum shuttle 40. These fiducials 84a-84d may be used to accurately position the beam 39 from laser 38. For example, an imaging system (not shown in this view) may be used to align the laser 39 with respect to the vacuum shuttle 40 by capturing views of the vacuum shuttle 40 from the point of view of the output of the laser 38 and a controller may use these images to accurately center laser 38 with respect to the vacuum shuttle 40 (e.g., by ensuring that the fiducials are equidistant (or other prescribed distance(s)) from a center of a field of view of the imaging device.

Figure 11:
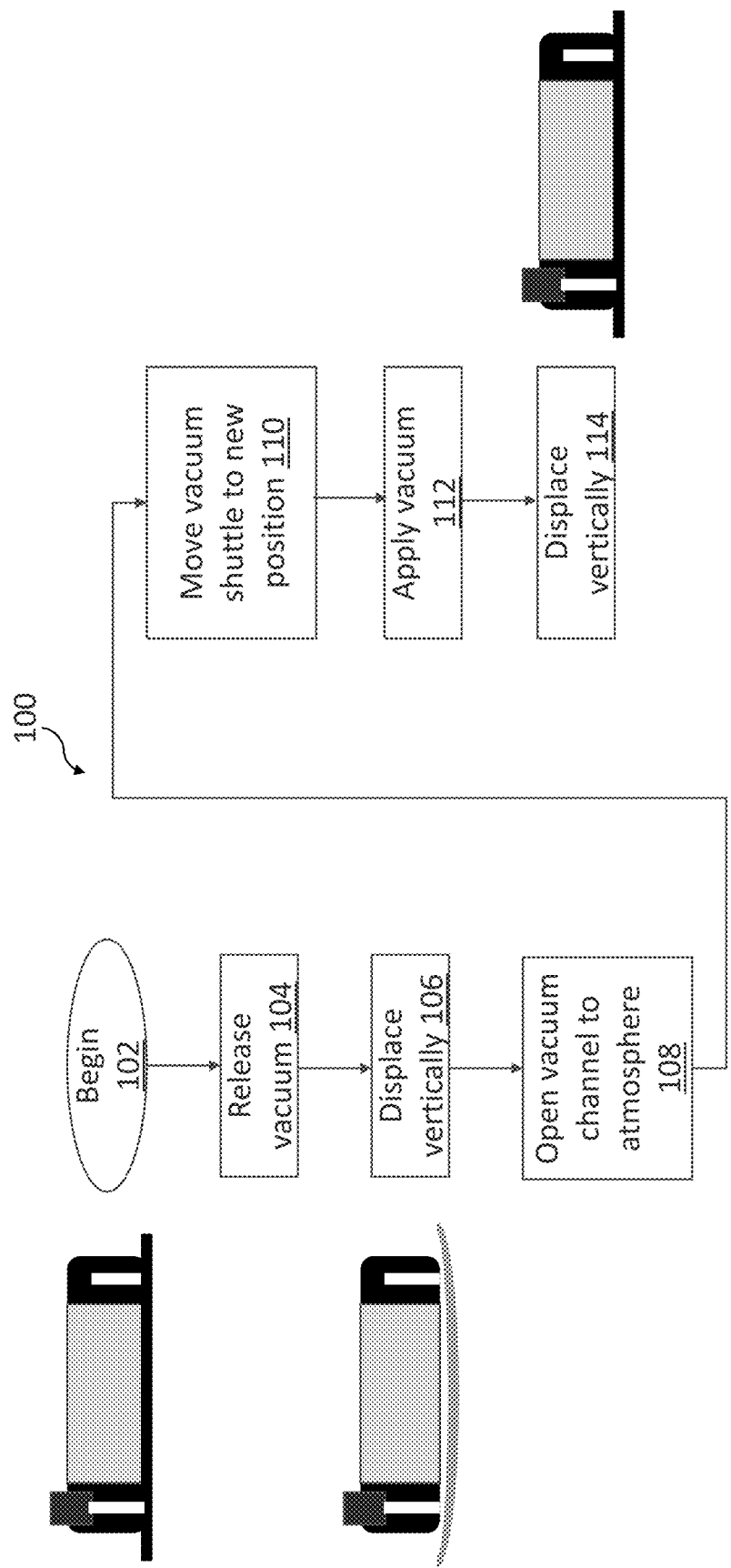
FIG. 11 is a flow diagram illustrating one method of adjusting the position of a vacuum shuttle with respect to a receiving substrate, in accordance with an embodiment of the invention.

One method of adjusting the position of the vacuum shuttle 40 with respect to a receiving substrate 16 will now be explained in connection with the flow diagram shown in FIG. 11. For purposes of this example process 100, it is assumed that the vacuum shuttle 40 begins in the configuration shown in the inset diagram next to step 102, with a vacuum applied so that the donor substrate 28 is held taut against the bottom of the vacuum shuttle 40. This is the configuration also illustrated in FIG. 8B.

At step 104, the vacuum is released. The result is that the donor substrate 28 is no longer held taut against the bottom of the vacuum shuttle 40 by the presence of the vacuum and so movement of the vacuum shuttle 40 may occur without damaging the donor substrate 28. For example, the vacuum shuttle 40 may first be moved vertically, 106, so as to be displaced from the donor substrate 28 in the direction of laser 38. The result is that the vacuum shuttle 40 and the donor substrate 28 are now slightly apart from one another, as shown in the inset diagram. This is the configuration also illustrated in FIG. 8A.

Next, at 108, the vacuum channel 70 may be fully opened to the surrounding atmosphere so as to ensure no residual vacuum force will remain when the vacuum shuttle 40 is moved. Then, at 110, the vacuum shuttle 40 may be moved laterally with respect to the donor substrate 28, e.g., as shown in FIGS. 5A and 5B, so as to be positioned over a new portion of the donor substrate 28. In some instances, positive pressure may be applied to the vacuum channel 70 (e.g., at step 108 by reversing the flow of the vacuum pump) so as to maintain a separation between the vacuum shuttle 40 and the donor substrate 28 during the time the vacuum shuttle 40 is moving with respect to the donor substrate 28.

With the vacuum shuttle 40 in its new position, the laser 38 may, optionally, also be moved, as shown in FIGS. 5A and 5B and aligned to the vacuum shuttle 40 using the fiducial markers 84a-84d on the vacuum shuttle 40. Then, at 112, the vacuum may again be applied, and the vacuum shuttle 40 lowered towards the donor substrate 28, at 114, so that as a result of the vacuum suction through the vacuum channel 70 of the vacuum shuttle 40, the donor substrate 28 is again brought taut against the bottom of the vacuum shuttle 40, as shown in the inset diagram. Printing at the new location of the vacuum shuttle 40 may now take place. Note that the repositioning of the vacuum shuttle 40 at step 110 may be in one or two dimensions, as shown in FIGS. 4A and 4B. This may involve moving the assembly of which the vacuum shuttle 40 is apart with respect to a stationary receiving substrate 16, or moving the receiving substrate 16 with respect to the assembly of which the vacuum shuttle 40 is a part, in addition to laterally moving the vacuum shuttle 40 itself.

In some embodiments of the invention, after printing of one material from the donor substrate 28, the donor substrate 28 may be coated with a second, different material for a second (or additional) printing of this second material onto the receiving substrate 16. The donor substrate 28 may be moved by motors 26a, 26b, e.g., where the donor substrate 28 is a film or similar substrate. Or, where the donor substrate 28 is a continuous film substrate, it may be moved by rolling from dispensing reel 22a towards take-up reel 22b to deliver the second material to the area under the vacuum shuttle 40.

In some embodiments of the invention, during movement of the vacuum shuttle 40 and/or the donor substrate 28, the material printed on the receiving substrate 16 (which may be a material that can be cured by UV light or by heating) may be cured by UV light or dried by a heater. Alternatively, this curing may occur after all of the printing has been completed.

As alluded to throughout the above, it should be appreciated that the various components of the printing systems described herein operate under the control of one or more controllers, which, preferably, are processor-based controllers that operate under the instruction of machine-executable instructions stored on tangible machine-readable media. Such controllers may include a microprocessor and memory communicatively coupled to one another by a bus or other communication mechanism for communicating information. The memory may include a program store memory, such as a read only memory (ROM) or other static storage device, as well as a dynamic memory, such as a random-access memory (RAM) or other dynamic storage device, and each may be coupled to the bus for providing and storing information and instructions to be executed by the microprocessor. The dynamic memory also may be used for storing temporary variables or other intermediate information during execution of instructions by the microprocessor. Alternatively, or in addition, a storage device, such as a solid state memory, magnetic disk, or optical disk may be provided and coupled to the bus for storing information and instructions. The controller may also include a display, for displaying information to a user, as well as various input devices, including an alphanumeric keyboard and a cursor control device such as a mouse and/or trackpad, as part of a user interface for the printing system. Further, one or more communication interfaces may be included to provide two-way data communication to and from the printing system. For example, network interfaces that include wired and/or wireless modems may be used to provide such communications.

Thus, systems and methods for laser printing a material from a foil or a film over a large area by a laser assisted deposition/laser dispensing system have been described. Many other embodiments will be apparent to those of skill in the art upon reviewing the above description. The scope of the invention should, therefore, be determined with reference to the appended claims, along with the full scope of equivalents to which such claims are entitled.

LIST OF REFERENCE NUMERALS

10 System
12 Narrow Gap Printing System
14a,b Preprinting Processing and/or Inspection
16 Receiving Substrate
18 Coating System
20 Large Area Laser Printing System, Printing Unit
22a Dispensing Reel
22b Take-up Reel
24a-h Roller
26a,b Motor
28 Donor Substrate
30 Coating Area
32 Dispensing Area
34 Dots
36 Laser Assisted Deposition System
38 Laser
39 Laser Beam
40 Vacuum Shuttle
42 Window, Central Opening
44a,b Rails
50 Receiving Substrate Stage
52 First Distance
54 Second Distance
70 Vacuum Channel
72 Outer Edge
74 Inner Edge
76 Portion
78 Vacuum Inlet
80 Distance Sensor
80a,b,c Distance Sensor
82 Imaging Sensors
82a,b Imaging Systems
84a-d Fiducial Markers
100 Process
102 Step
104 Step
106 Step 108 Step
110 Step
112 Step
114 Step

What is claimed is:

1. A system for laser assisted deposition of a material, comprising a donor substrate, a supporting assembly, a receiving substrate, a laser assisted deposition system configured to print individual dot-like portions of a material from the donor substrate onto the receiving substrate, a vacuum shuttle configured to be positionable between the laser assisted deposition system and the donor substrate and to engage said donor substrate upon application of a vacuum to the vacuum shuttle,
 wherein the vacuum shuttle is laterally translatable along a first axis parallel to the receiving substrate within a dispensing area of the system and the supporting assembly in which the vacuum shuttle is supported is laterally translatable along a second axis orthogonal to the first axis,
 wherein the supporting assembly comprises a plurality of rails and a plurality of rollers that are supported by the plurality of rails,
 wherein the laser assisted deposition system comprises a laser and the vacuum shuttle includes an open window through which the laser is configured to irradiate the donor substrate, and
 wherein the vacuum shuttle further includes a vacuum channel about its periphery, the vacuum channel fluidly coupled to a vacuum inlet for receiving a vacuum suction.

2. The system of claim 1, wherein the system further comprises a coating system configured to create a uniform layer of the material on the donor substrate.

3. The system of claim 1, wherein the vacuum shuttle further includes one or more distance measuring sensors for determining a position of the vacuum shuttle with respect to the receiving substrate.

4. The system of claim 1, wherein the vacuum shuttle further includes one or more imaging sensors for imaging the receiving substrate.

5. The system of claim 4, wherein the vacuum shuttle further includes one or more distance measuring sensors for determining a position of the vacuum shuttle with respect to the receiving substrate.

6. The system of claim 1, wherein the vacuum shuttle further includes one or more fiducial markers for use in aligning the laser.

7. The system of claim 1, wherein the dispensing area is located between the plurality of rollers.

8. A method of operating a system in which a laser assisted deposition system is configured to print individual dot-like portions of a material from a donor substrate onto a receiving substrate and a vacuum shuttle is configured to be positionable between the laser assisted deposition system and the donor substrate, the method comprising:
 positioning the vacuum shuttle adjacent to a portion of the donor substrate by translating the vacuum shuttle laterally along a first axis parallel to the receiving substrate within a dispensing area of the system;
 translating a supporting assembly in which the vacuum shuttle is supported laterally along a second axis orthogonal to the first axis and parallel to the receiving substrate, wherein the supporting assembly comprises a plurality of rails and a plurality of rollers that are supported by the plurality of rails;
 applying, via a vacuum inlet in the vacuum shuttle, a vacuum suction to a vacuum channel formed in a bottom side of a perimeter defining a central opening of the vacuum shuttle so as to cause the vacuum shuttle to engage the donor substrate by suction and hold the donor substrate taught against the bottom side of the vacuum shuttle; and
 printing the dot-like portions of the material from the donor substrate onto the receiving substrate using a laser of the laser assisted deposition system by directing a laser beam produced by the laser through the central opening of the vacuum shuttle onto the donor substrate.

9. The method of claim 8, further comprising:
 releasing the vacuum suction, thereby causing the vacuum shuttle to disengage from the donor substrate; and
 displacing the vacuum shuttle vertically from the donor substrate.

10. The method of claim 9, further comprising, after displacing the vacuum shuttle vertically from the donor substrate, moving the vacuum shuttle laterally with respect to the donor substrate.

11. The method of claim 10, wherein the lateral movement is in two dimensions.

12. The method of claim 10, further comprising moving the laser and aligning the laser with respect to the vacuum shuttle using one or more fiducial markers on the vacuum shuttle.

13. The method of claim 8, wherein the dispensing area is located between the plurality of rollers.

* * * * *